(12) United States Patent
Murotani

(10) Patent No.: US 7,093,269 B2
(45) Date of Patent: Aug. 15, 2006

(54) DISK DRIVE WITH HOOK DISPOSED ON CLAMP ARM AND/OR PLAYBACK BASE ENGAGING GROOVE FORMED IN FIXED BASE

(75) Inventor: Kiichiro Murotani, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 351 days.

(21) Appl. No.: 10/774,436

(22) Filed: Feb. 10, 2004

(65) Prior Publication Data

US 2004/0177363 A1   Sep. 9, 2004

(30) Foreign Application Priority Data

Mar. 6, 2003   (JP) .............................. 2003-060174

(51) Int. Cl.
*G11B 17/028* (2006.01)
*G11B 25/04* (2006.01)

(52) U.S. Cl. ................... 720/605; 720/657; 720/662; 720/673; 720/690; 720/707; 720/713

(58) Field of Classification Search ............. 720/604, 720/605, 657, 662, 667, 673, 690, 706, 707, 720/713

See application file for complete search history.

(56) References Cited

U.S. PATENT DOCUMENTS 6,907,612 B1*  6/2005  Takeshima et al. ......... 720/605

FOREIGN PATENT DOCUMENTS

JP         11-353769 A      12/1999
WO    WO 3036636 A1 *    5/2003

* cited by examiner

*Primary Examiner*—Craig A. Renner
(74) *Attorney, Agent, or Firm*—Birch, Stewart, Kolasch and Birch, LLP

(57) ABSTRACT

When a disk (1) is placed at a playback position, a clamp arm (15) clamps the disk (1). The clamp arm (15) has an engagement hook (16) for engaging with an engagement groove (12) of a fixed base (11) when the clamp arm (15) pivots on a slide base (13) so as to return to a standby position for waiting for a pivot while the slide base (13) slides.

2 Claims, 17 Drawing Sheets

DISK DRIVE WITH HOOK DISPOSED ON CLAMP ARM AND/OR PLAYBACK BASE ENGAGING GROOVE FORMED IN FIXED BASE

This Non-provisional application claims priority under 35 U.S.C. §119 (a) on Patent Application No (s). 2003-060174 filed in Japan on Mar. 6, 2003, the entire contents of which are hereby incorporated by reference.

BACKGROUND OF THE INVENTION

1. Field of the Invention

The present invention relates to a disk drive that can prevent a clamp arm from pivoting and vibrating even if the clamp arm receives vibrations and impacts when it remains in standby for waiting for a pivot.

2. Description of the Related Art

A prior art disk drive disclosed in Japanese patent application publication (TOKKAIHEI) No. 11-353769 (see paragraph numbers [0043] to [0045] and FIG. 11) is provided with a locking mechanism for engaging with a pivoting end portion of a holding base when a playback mechanism for playing back a disk is placed at a playback position, and for releasing the engagement with the holding base when the playback mechanism is placed at a retracted position. Because the prior art disk drive is provided with such a locking mechanism, the prior art disk drive can prevent vertical movements of an arm engaged with the holding base when the playback mechanism for playing back the disk is placed at the playback position.

However, when the locking done by the locking mechanism is imperfect, vibrations, impacts, or the like imposed on the holding base in a direction in which the holding base pivots can reach the arm engaged with the holding base. In order to assist the locking done by the locking mechanism, the prior art disk drive is further provided with a locking arm that engages with the holding base after the holding base is engaged with the locking mechanism and a driving mechanism for driving the locking arm.

A problem with the prior art disk drive constructed as mentioned above is that the prior art disk drive has to have a locking arm that engages with the holding base and a driving mechanism for driving the locking arm in addition to the locking mechanism in order to prevent the arm engaged with the holding base from vibrating, and therefore the structure of the disk drive becomes more complicated.

SUMMARY OF THE INVENTION

The present invention is proposed to solve the above-mentioned problems, and it is therefore an object of the present invention to provide a disk drive that can prevent a clamp arm that remains at a standby position for waiting for a pivot from pivoting and vibrating without addition of a special mechanism.

In accordance with the present invention, there is provided a disk drive including an engagement hook disposed on either or both of a playback base and a clamp arm, the engagement hook engaging with an engagement groove of a fixed base when the clamp arm pivots on a slide base so as to return to a standby position for waiting for a pivot while the slide base slides.

Therefore, the present invention offers an advantage of being able to prevent the clamp arm from pivoting and vibrating when the clamp arm is placed in a retracted state without addition of a special mechanism.

Further objects and advantages of the present invention will be apparent from the following description of the preferred embodiments of the invention as illustrated in the accompanying drawings.

DETAILED DESCRIPTION OF THE PREFERRED EMBODIMENT

The invention will now be described with reference to the accompanying drawings.

Embodiment 1

Figure 1:
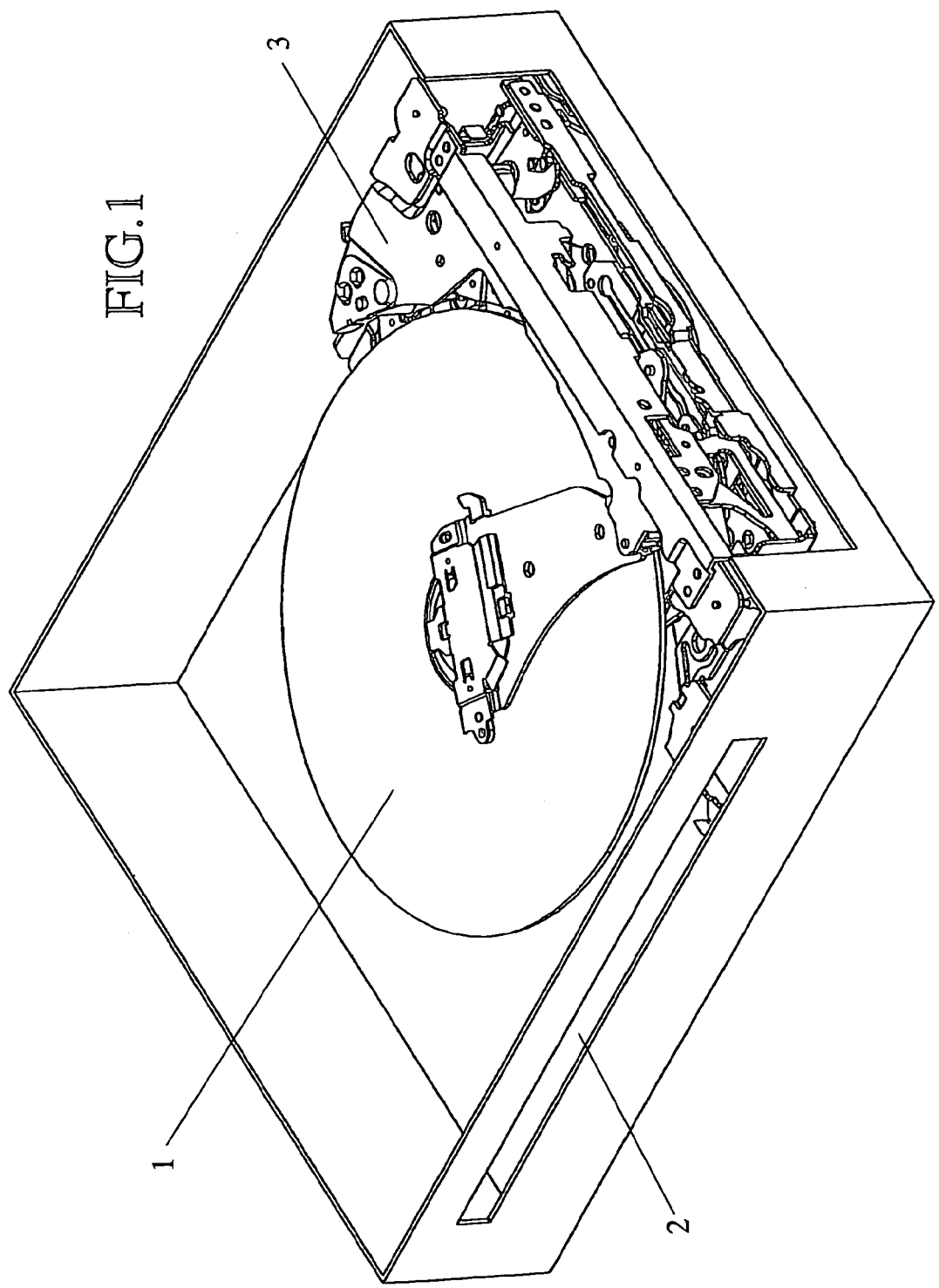
FIG. 1 is a perspective view showing the structure of the whole of a disk drive in accordance with embodiment 1 of the present invention.
Figure 2:
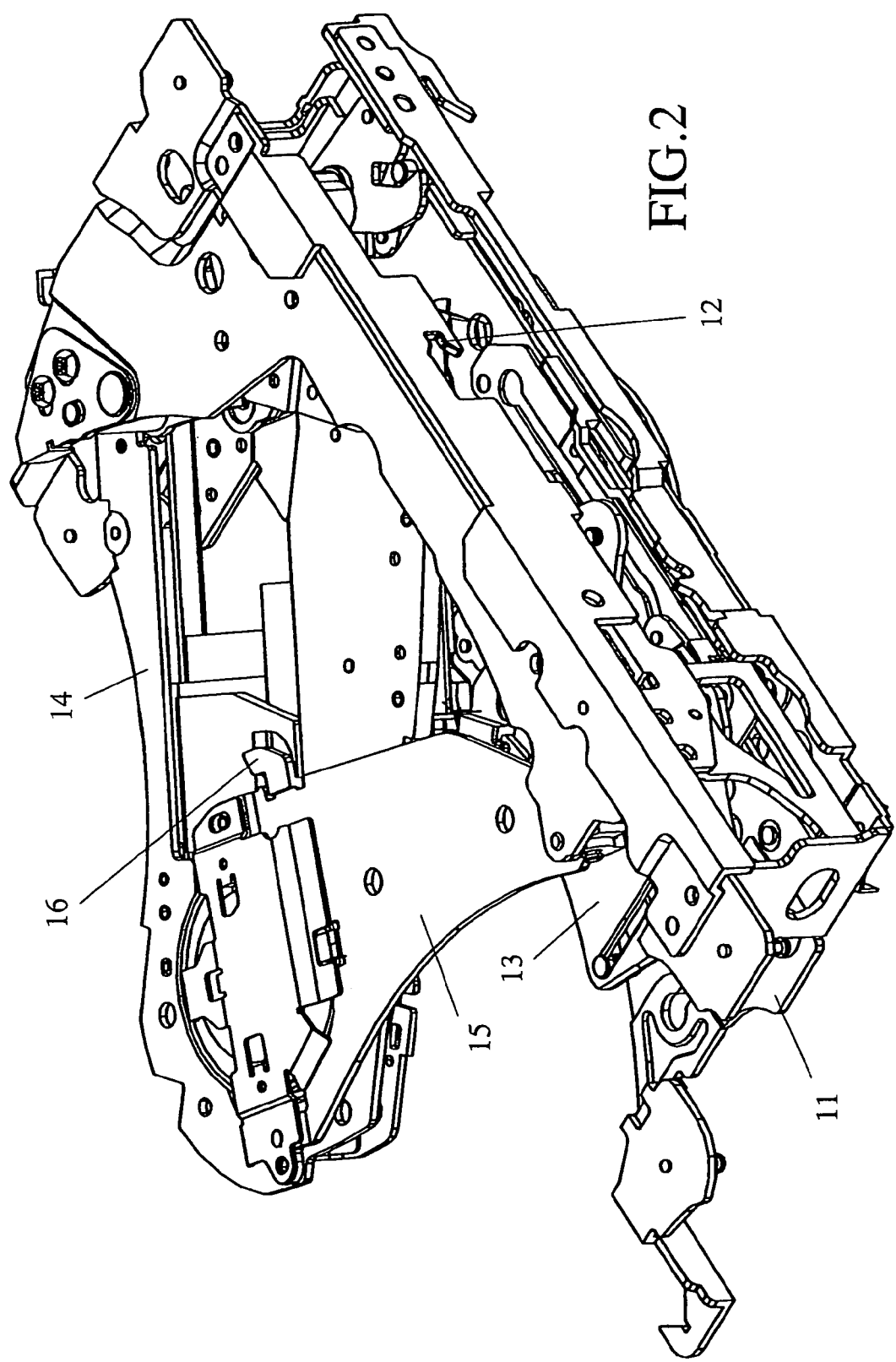
FIG. 2 is a perspective view showing a playback unit of the disk drive in accordance with embodiment 1 of the present invention.

FIG. 1 is a perspective view showing the whole of a disk drive in accordance with embodiment 1 of the present invention, and FIG. 2 is a perspective view showing a playback unit of the disk drive in accordance with embodiment 1 of the present invention. In the figure, a disk 1 is inserted into the disk drive by way of a disk insertion opening 2 and is held by the playback unit 3. A fixed base 11 has an engagement groove 12 that engages with an engagement hook 16 of a clamp arm 15. A slide base 13 is slidably disposed with respect to the fixed base 11 and a playback base 14 is pivotably disposed with respect to the slide base 13, and a turntable on which the disk 1 is placed is disposed on the playback base 14. The clamp arm 15 is pivotably disposed with respect to the slide base 13. The clamp arm 15 clamps the disk 1 when the disk 1 is placed at a playback position. The engagement hook 16 of the clamp arm 15 engages with the engagement groove 12 of the fixed base 11 while the clamp arm 15 returns to a standby position at which the clamp arm 15 remains on standby for waiting for a pivot. When the clamp arm 15 returns to the standby position, the slide base 13 slides while the clamp arm 15 pivots on the slide base 13, so that the engagement hook 16 of the clamp arm is engaged with the engagement groove 12 of the fixed base 11.

Figure 17:
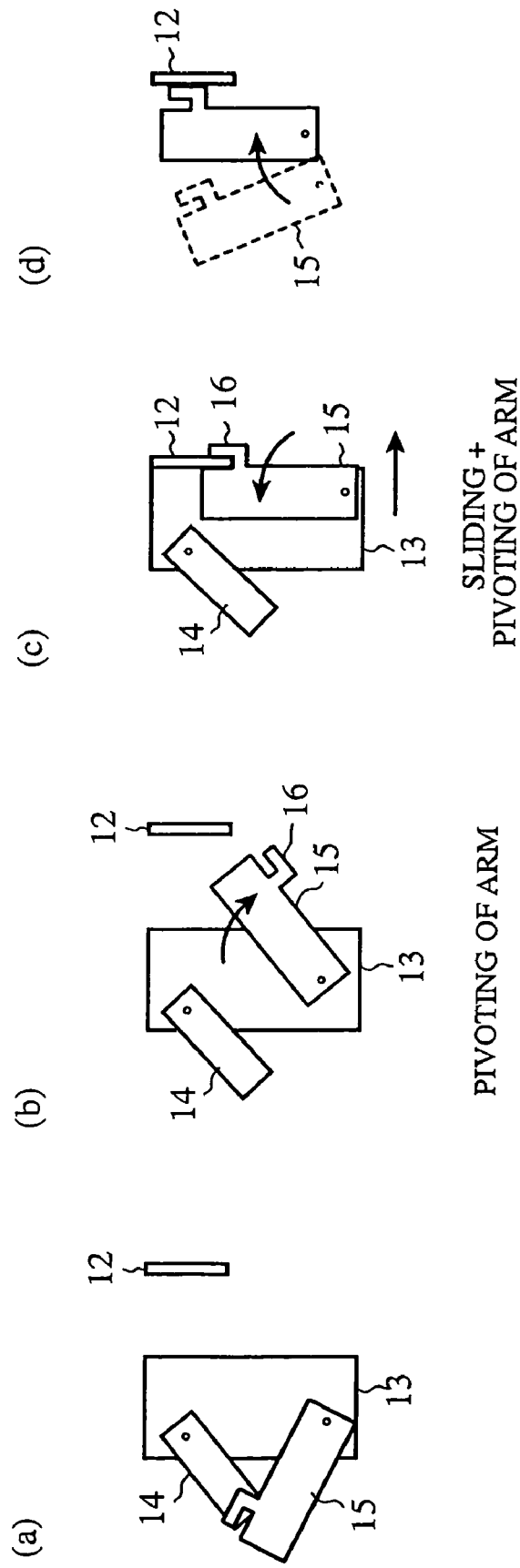
FIGS. 17a to 17d are diagrams showing the principle of operation of the disk drive of FIG. 1.

Next, a description will be made as to an operation of the disk drive in accordance with embodiment 1 of the present invention. The principle of operation of the disk drive will be explained first. When the clamp arm 15 returns from the playback position at which the disk 1 is reproduced (refer to FIG. 17a) to the standby position (refer to FIG. 17c), the clamp arm 15 pivots clockwise as shown in FIG. 17b. However, only the pivoting of the clamp arm 15 doesn't make it possible for the engagement hook 16 of the clamp arm 15 to be engaged with the engagement groove 12 of the fixed base 11, as shown in FIG. 17d.

Then, when the clamp arm 15 finishes pivoting and then reaches a predetermined position, the clamp arm 15 starts pivoting counterclockwise, and the slide base 13 simultaneously moves in a rightward direction, as shown in FIG. 17c. As a result, the engagement hook 16 of the clamp arm 15 is engaged with the engagement groove 12 of the fixed base 11.

Figure 3:
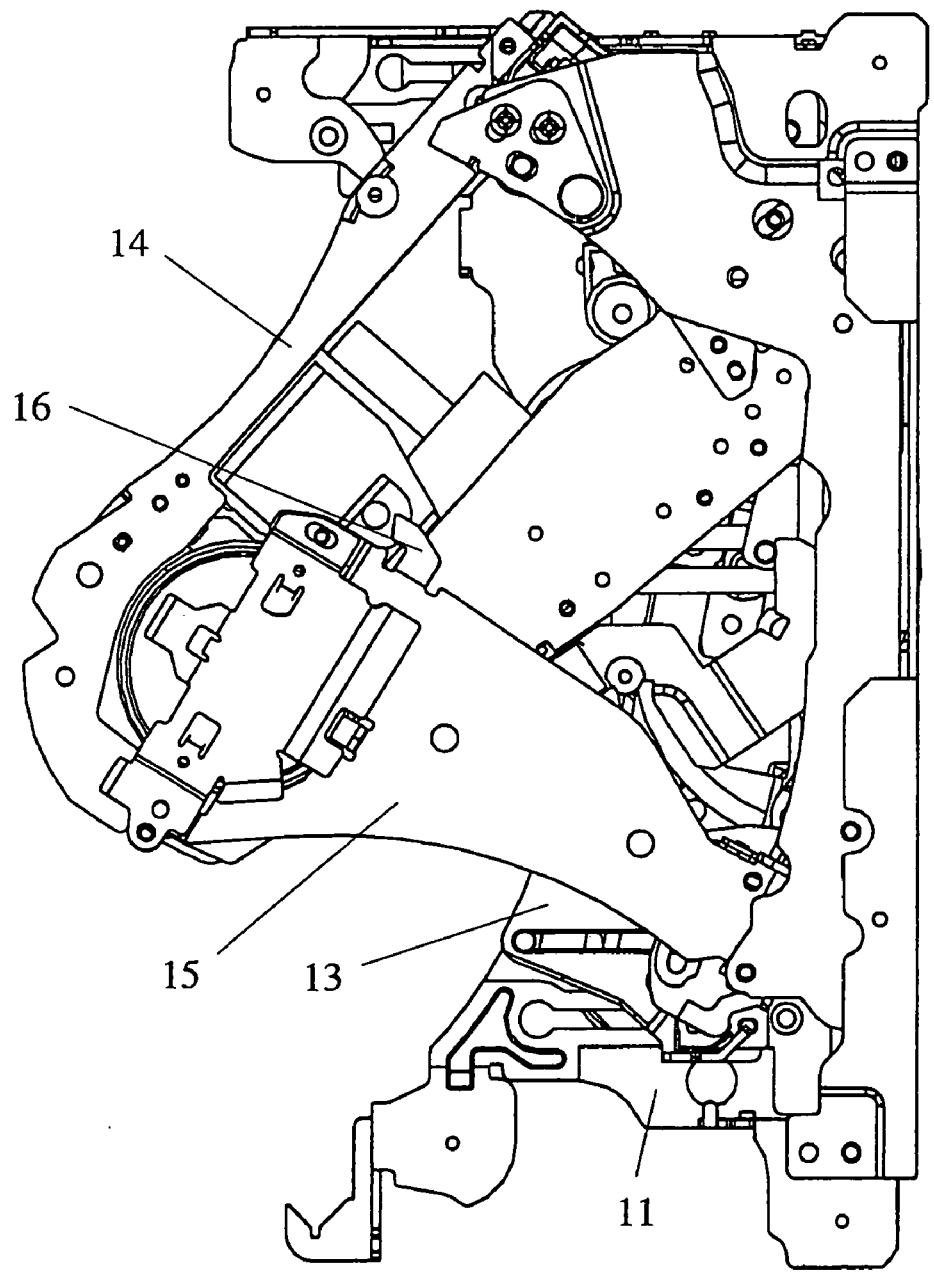
FIG. 3 is a top plan view showing the playback unit that is placed at a playback position.
Figure 4:
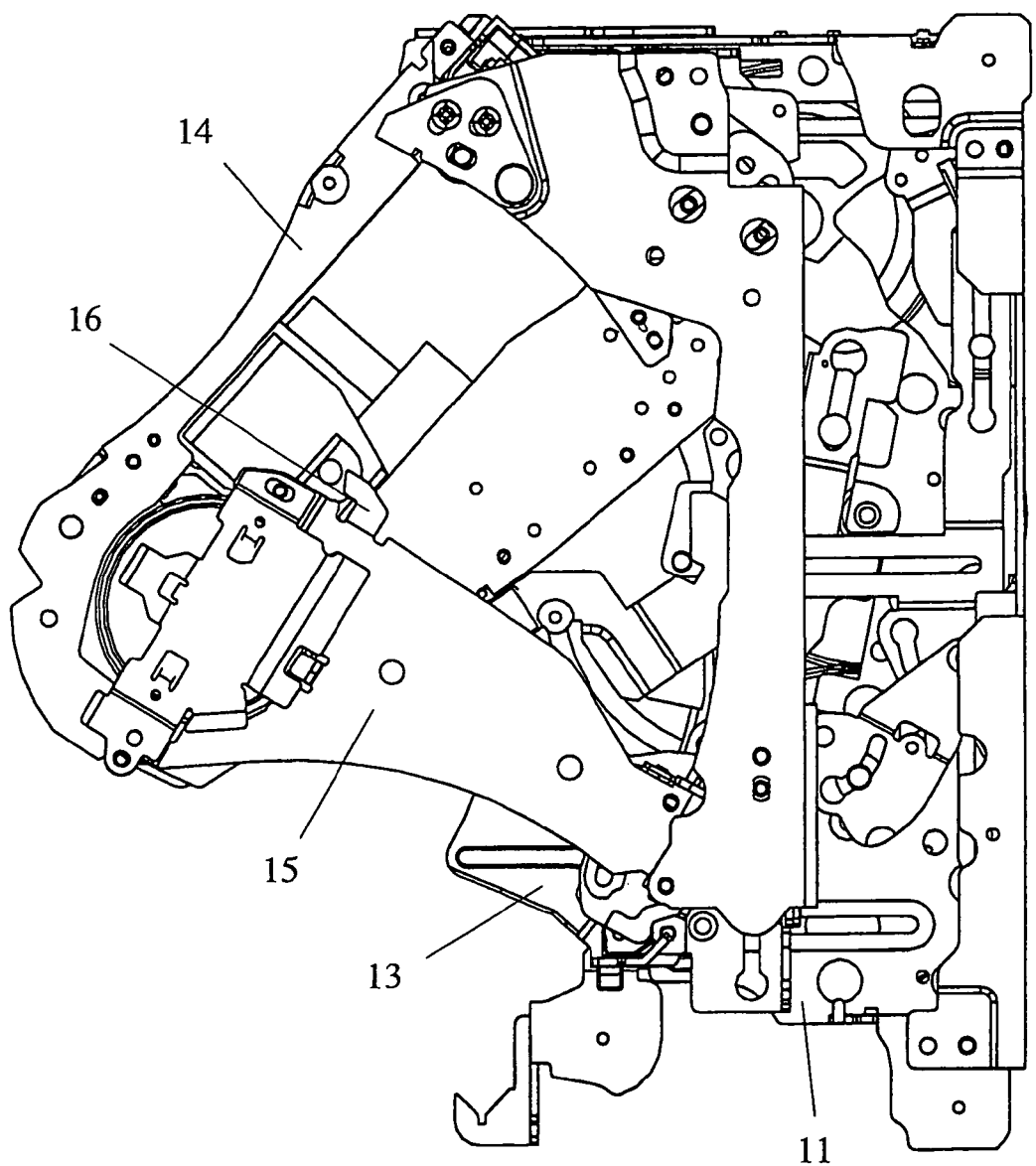
FIG. 4 is a top plan view showing a state in which a slide base is sliding.

Hereafter, the operation of the disk drive will be explained in detail. As shown in FIG. 3, when the playback base 14 of the playback unit 3 is placed at the playback position where the disk 1 is reproduced, the disk 1 is placed on the turntable of the playback base 14 and is then clamped by the clamp arm 15. In FIG. 3, the disk 1 is not illustrated. When the slide base 13 then slides on the fixed base 11 so as to move away from a position as shown in FIG. 3 in a leftward direction in the figure, the slide base 13 enters a state as shown in FIG. 4. When the slide base 13 slides to the position of FIG. 4, the clamp arm 15 is pushed up against a force applied thereto and releases the disk 1, and a holding mechanism not shown in the figure holds the disk 1.

Figure 5:
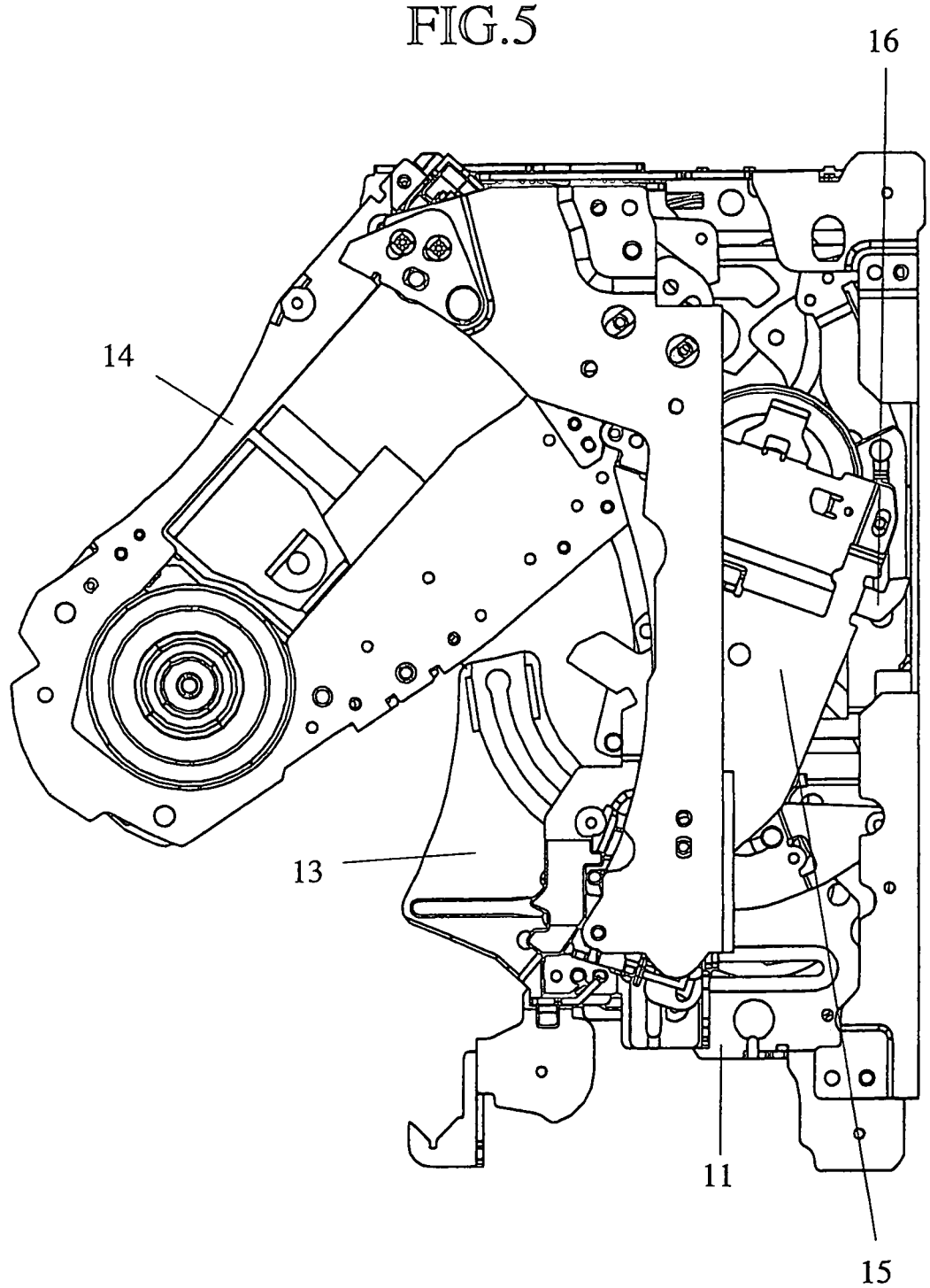
FIG. 5 is a top plan view showing a state in which a clamp arm is pivoting.
Figure 6:
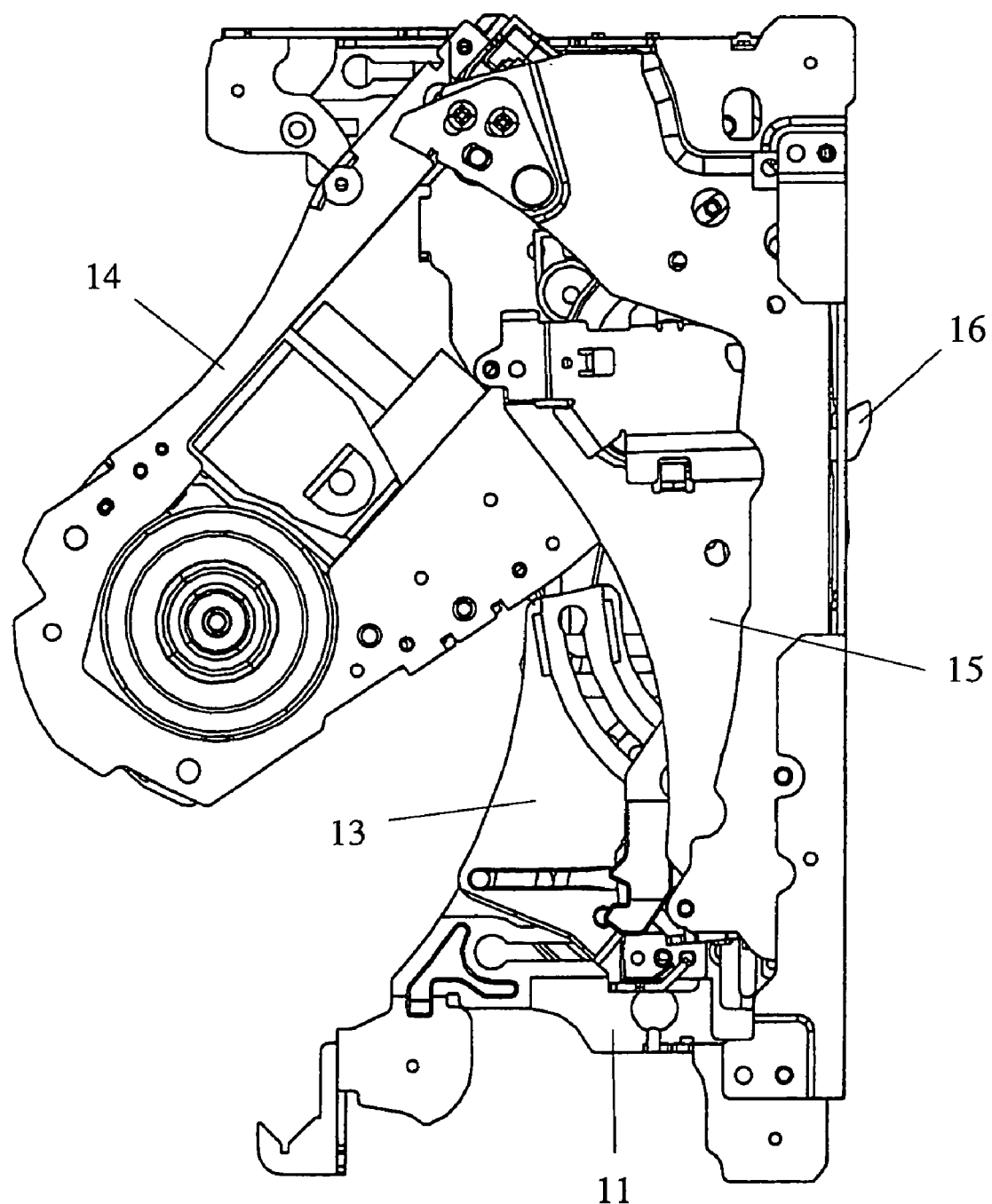
FIG. 6 is a top plan view showing a state in which the slide base is returning.
Figure 7:
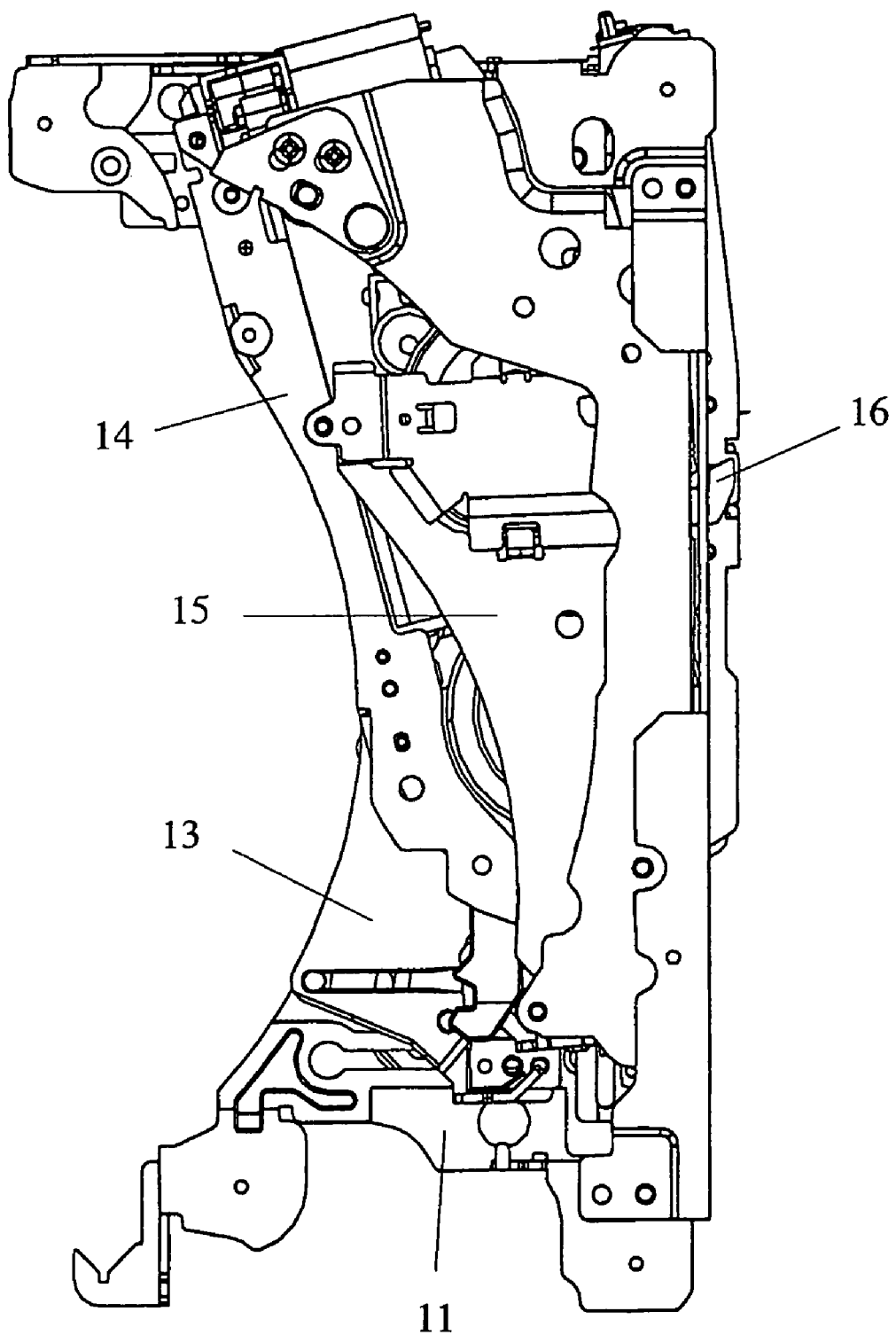
FIG. 7 is a top plan view showing a state in which the slide base is retracted.

When the clamp arm 15 releases the disk 1, as previously mentioned, the clamp arm pivots on the slide base 13, as shown in FIG. 5, and the disk 1 is lifted above the playback unit 3 by the holding mechanism not shown in the figure. When the slide base 13 then slides on the fixed base 11 in a rightward direction in the figure, the engagement hook 16 of the clamp arm 15 is engaged with the engagement groove 12 of the fixed base 11, as shown in FIG. 6. After the clamp arm 15 is retracted toward the fixed base, the playback base 14 of the playback unit 3 pivots and then moves to a standby position as shown in FIG. 7, so that the playback base 14 enters a retracted state in which the playback base 14 is retracted in the fixed base.

Figure 8:
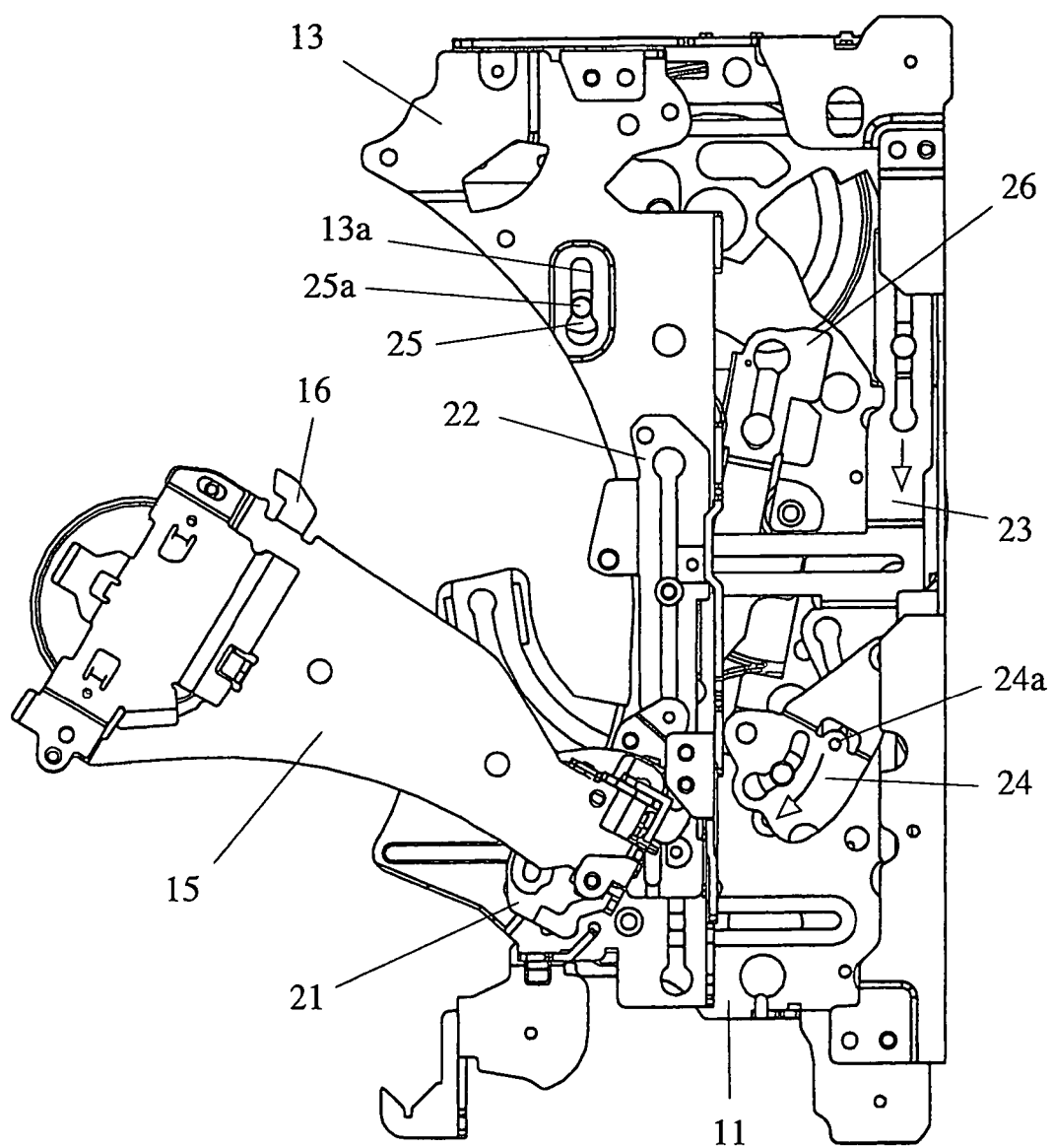
FIG. 8 is a top plan view showing a state in which the slide base is sliding.
Figure 16:
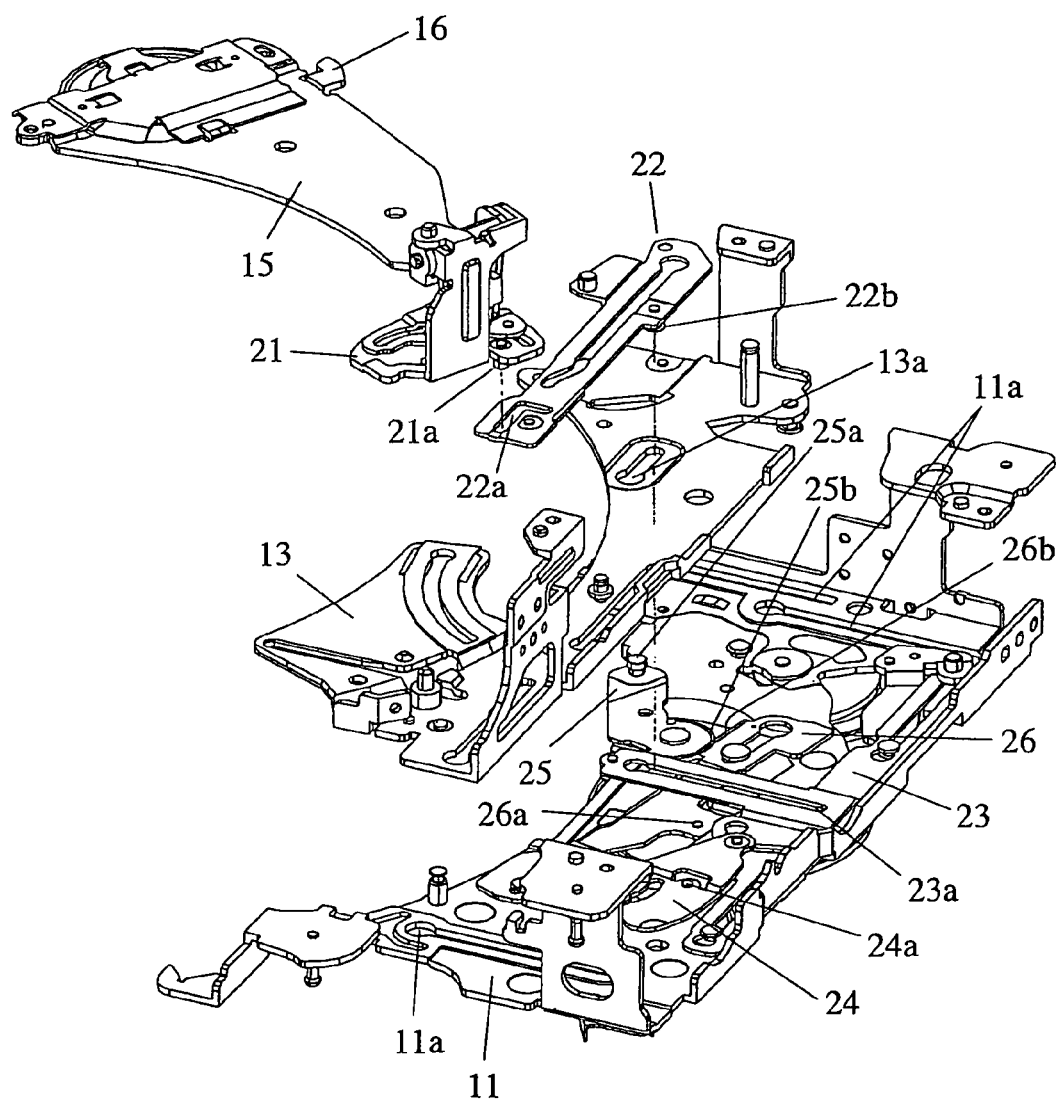
FIG. 16 is an exploded perspective view showing the playback unit of the disk drive.

Hereafter, the engagement operation of the clamp arm 15 will be explained in detail. FIG. 8 is a top plan view showing a state in which the slide base 13 is sliding, and FIG. 16 is an exploded perspective view showing the playback unit of the disk drive. In the figures, the clamp arm 15 is disposed on a pivot base 21 pivotably disposed on the slide base 13. The clamp arm 15 is pivotably held by the pivot base 21 so that the clamp arm can pivot vertically (i.e., in an upward or downward direction in the figure) in order to clamp the disk 1. As shown in FIG. 16, the pivot base 21 has a pin 21a that engages with an L-shaped groove 22a formed in a cam plate 22 disposed on the slide base 13. As a result, the pivot base 21 can slide in an upward or downward direction or in a rightward or leftward direction in the figure in synchronization with the movement of the slide base 13.

The fixed base 11 has a cam plate 23 slidably disposed therein and a driving lever 24 pivotably disposed therein for driving the cam plate 23. The cam plate 22 has a pin 22b that slidably engages with a groove 23a formed in the cam plate 23. The slide base 13 is engaged with a slide groove 11a disposed in the fixed base 11. The fixed base 11 has a lever 25 pivotably disposed therein for sliding the slide base 13 and a slide plate 26 for driving the lever 25. The lever 25 has a pin 25a projecting from an upper surface thereof and being engaged with a groove 13a of the slide base 13.

Figure 9:
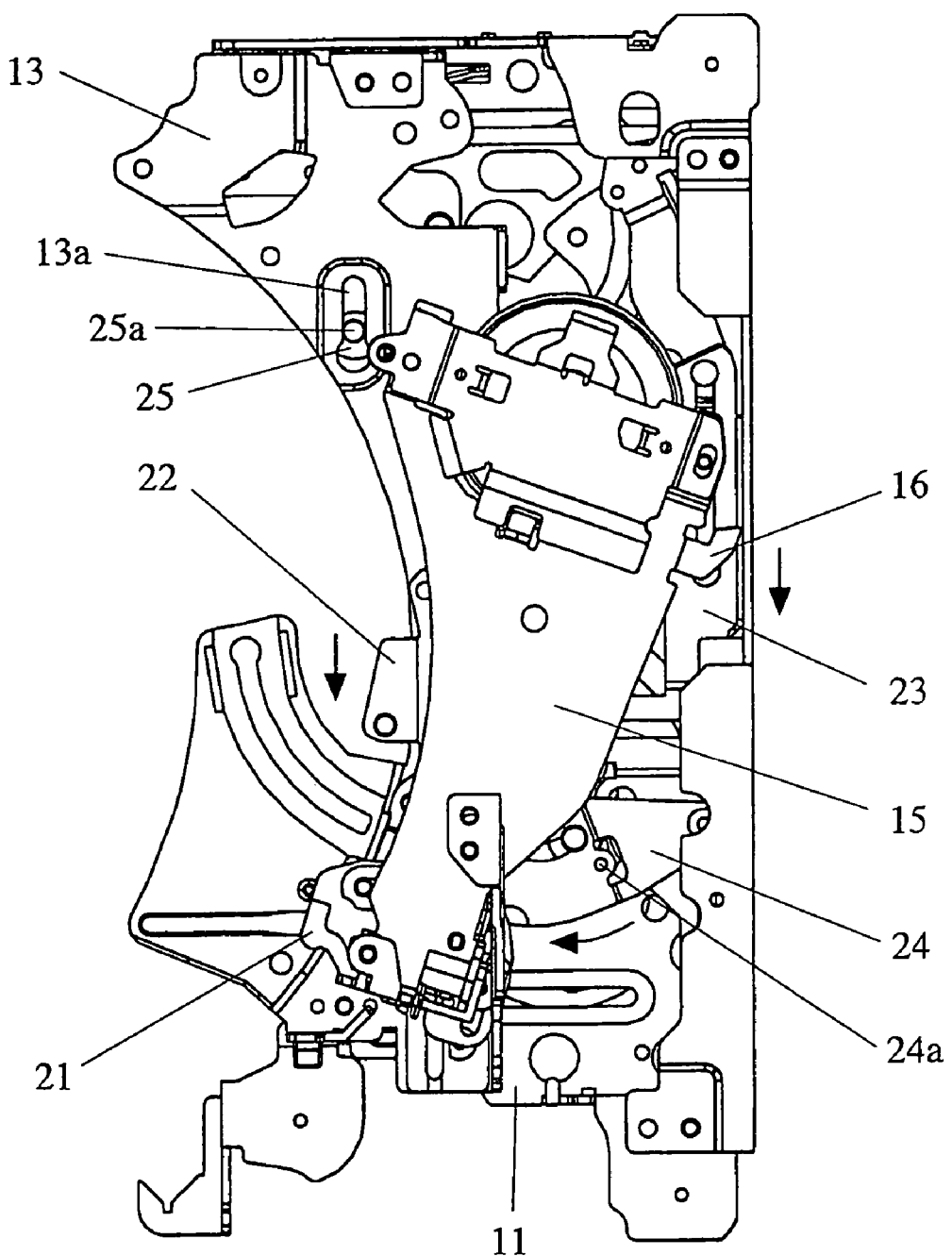
FIG. 9 is a top plan view showing a state in which the clamp arm is pivoting.
Figure 10:
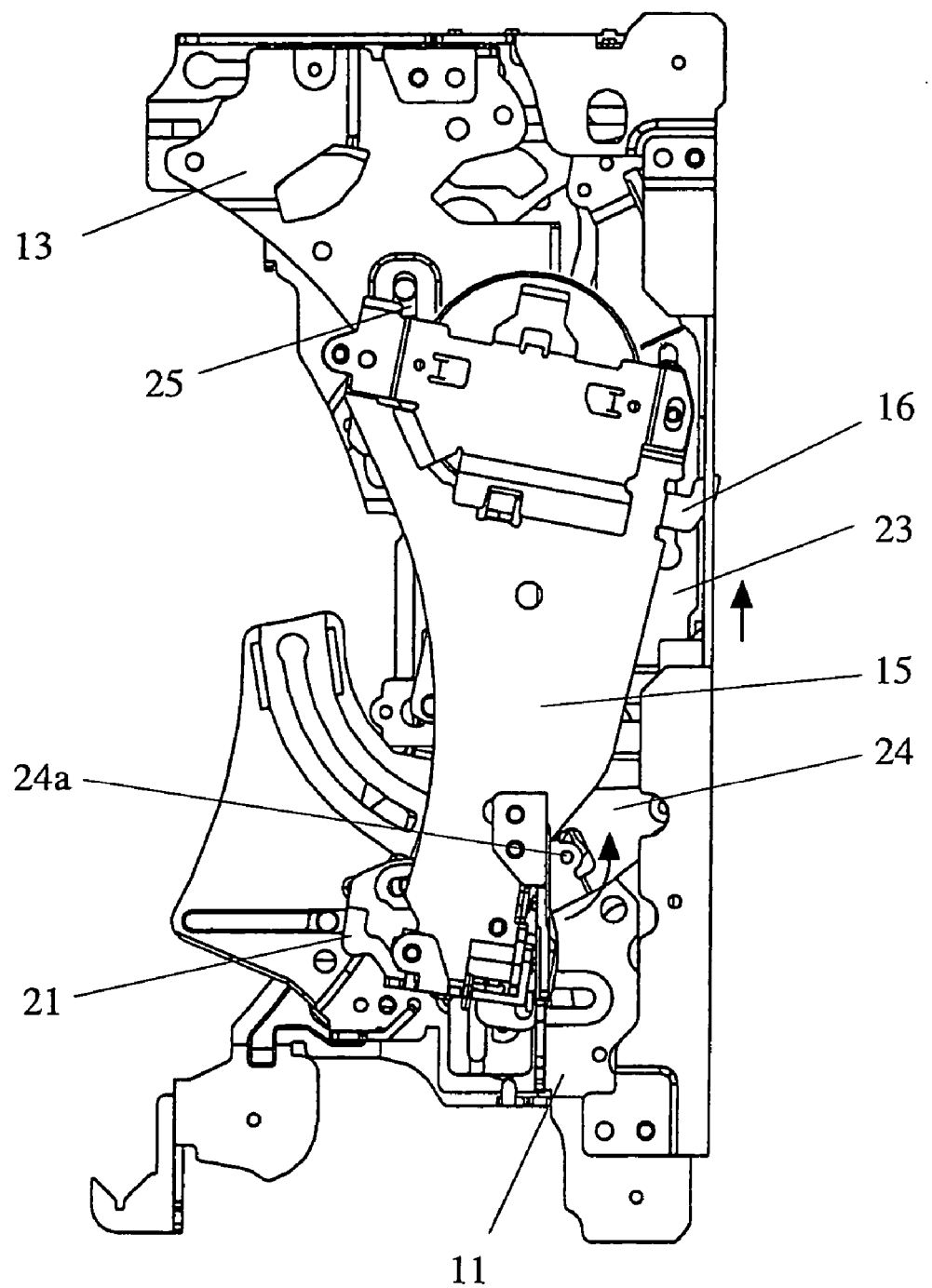
FIG. 10 is a top plan view showing an intermediate state in which the slide base is sliding.
Figure 11:
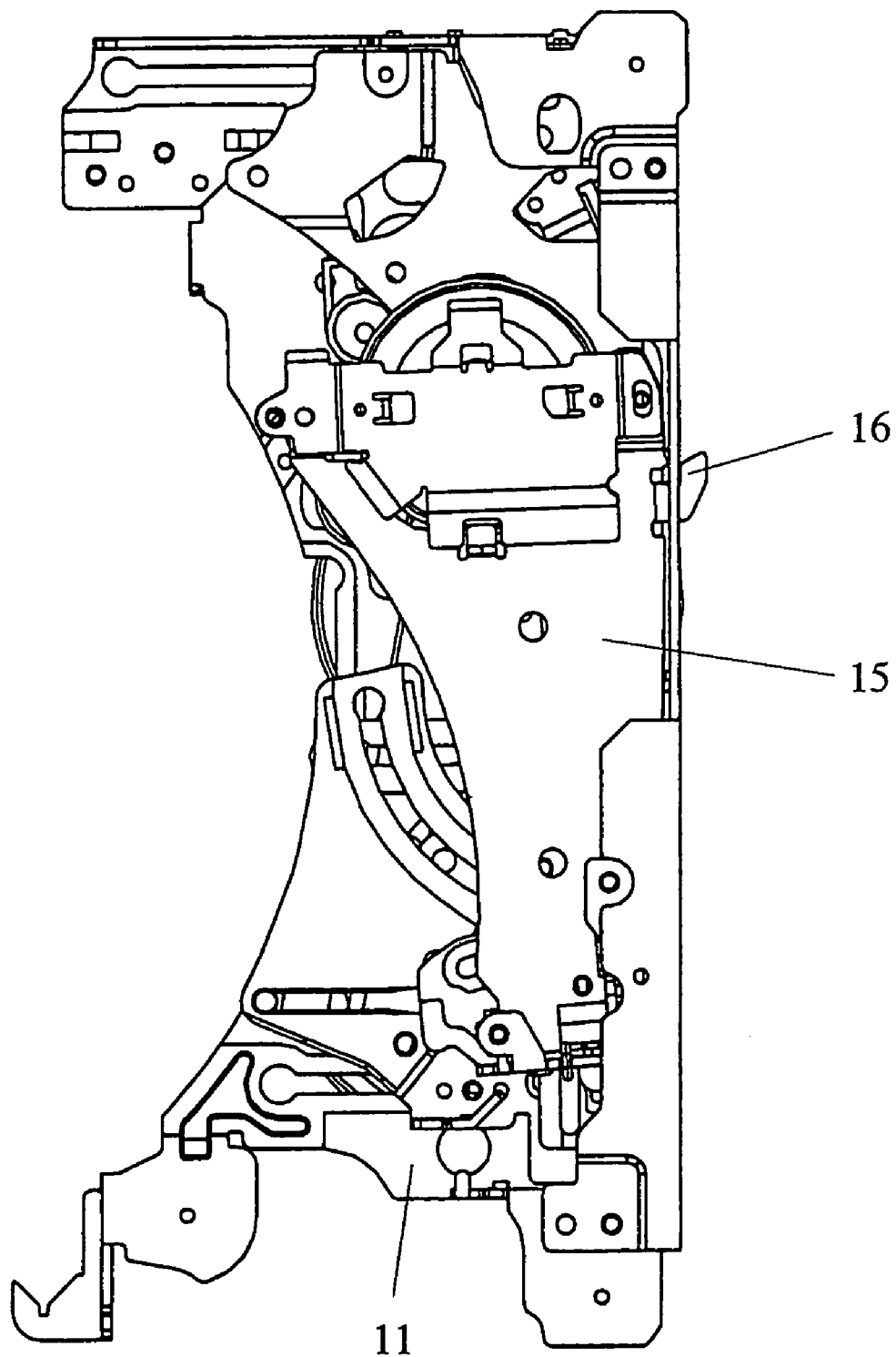
FIG. 11 is a top plan view a state in which the clamp arm is retracted.

When the driving lever 24 placed in the state of FIG. 8 pivots in a direction designated by an arrow shown in FIG. 9, the cam plate 23 moves the cam plate 22 in the direction of the arrow shown in the figure because the cam plate 23 slides in the direction of the arrow shown in the figure. As a result, the pivot base 21 engaged with the cam plate 22 and the clamp arm 15 pivot together and then reach positions as shown in FIG. 10. On the other hand, when the slide plate 26 slides in the direction of the arrow and a rack 26b of the slide plate 26 is then engaged with a pinion 25b of the lever 25, the lever 25 pivots and therefore makes the slide base 13 slide. At the same time when the slide base 13 is made to slide, the driving lever 24 pivots in the direction of the arrow shown in the figure and therefore makes the cam plate 23 slide in the direction of the arrow shown in the figure. As a result, the cam plate 22 is made to slide in a direction opposite to the direction of the arrow, and the clamp arm 15 is made to pivot in a direction opposite to the direction in which the clamp arm is moved to the retracted position in synchronization with the sliding of the slide base 13. This synchronized movement of the clamp arm makes it possible to keep the engagement hook 16 of the clamp arm 15 at a constant distance from the fixed base 11. After that, the sliding operation of the slide base 13 is finished, the engagement hook 16 of the clamp arm 15 is engaged with the fixed base 11 and the clamp arm 15 is completedly locked with respect to all directions, as shown in FIG. 11.

Figure 12:
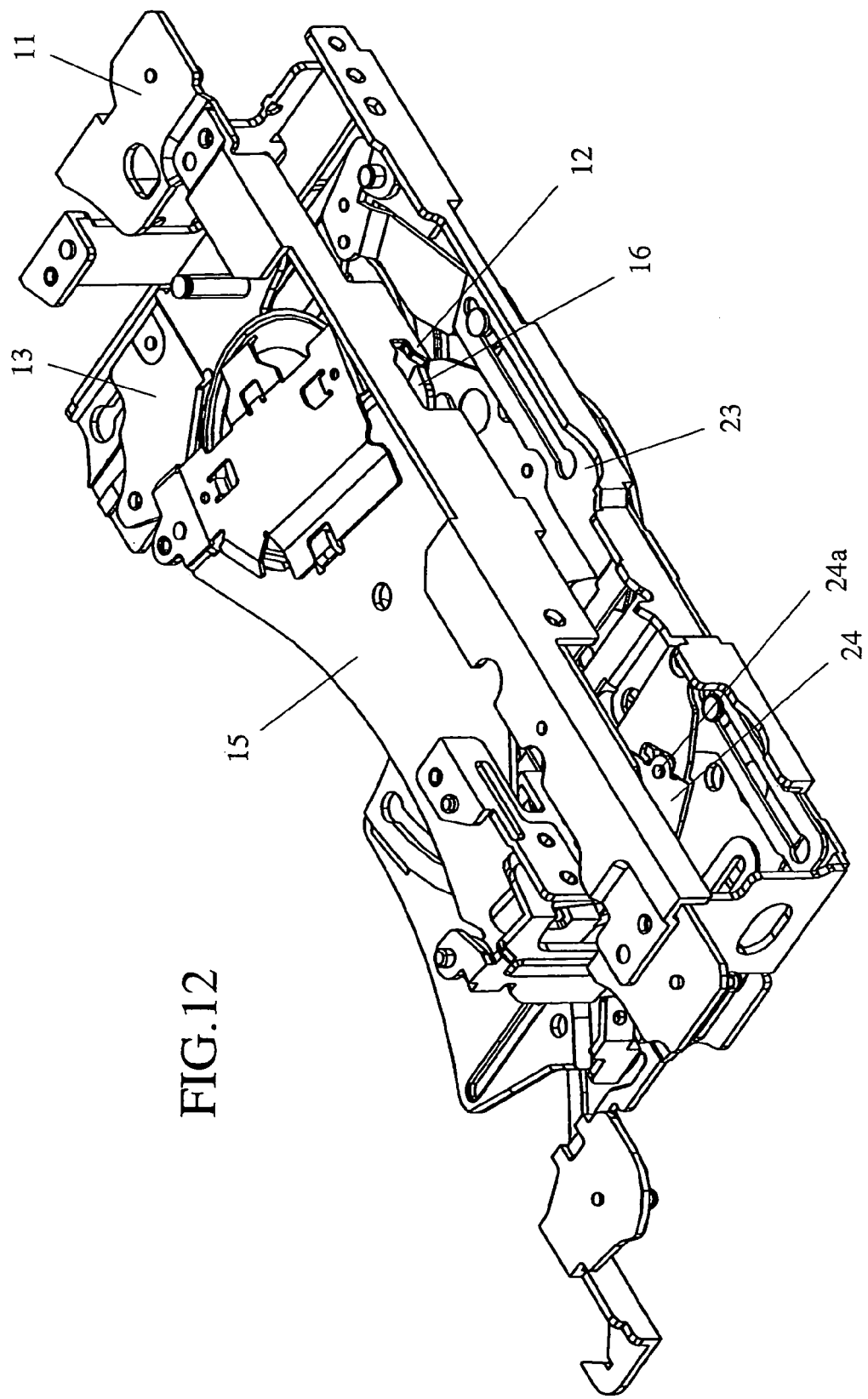
FIG. 12 is a perspective view showing an intermediate state in which the slide base is sliding.
Figure 13:
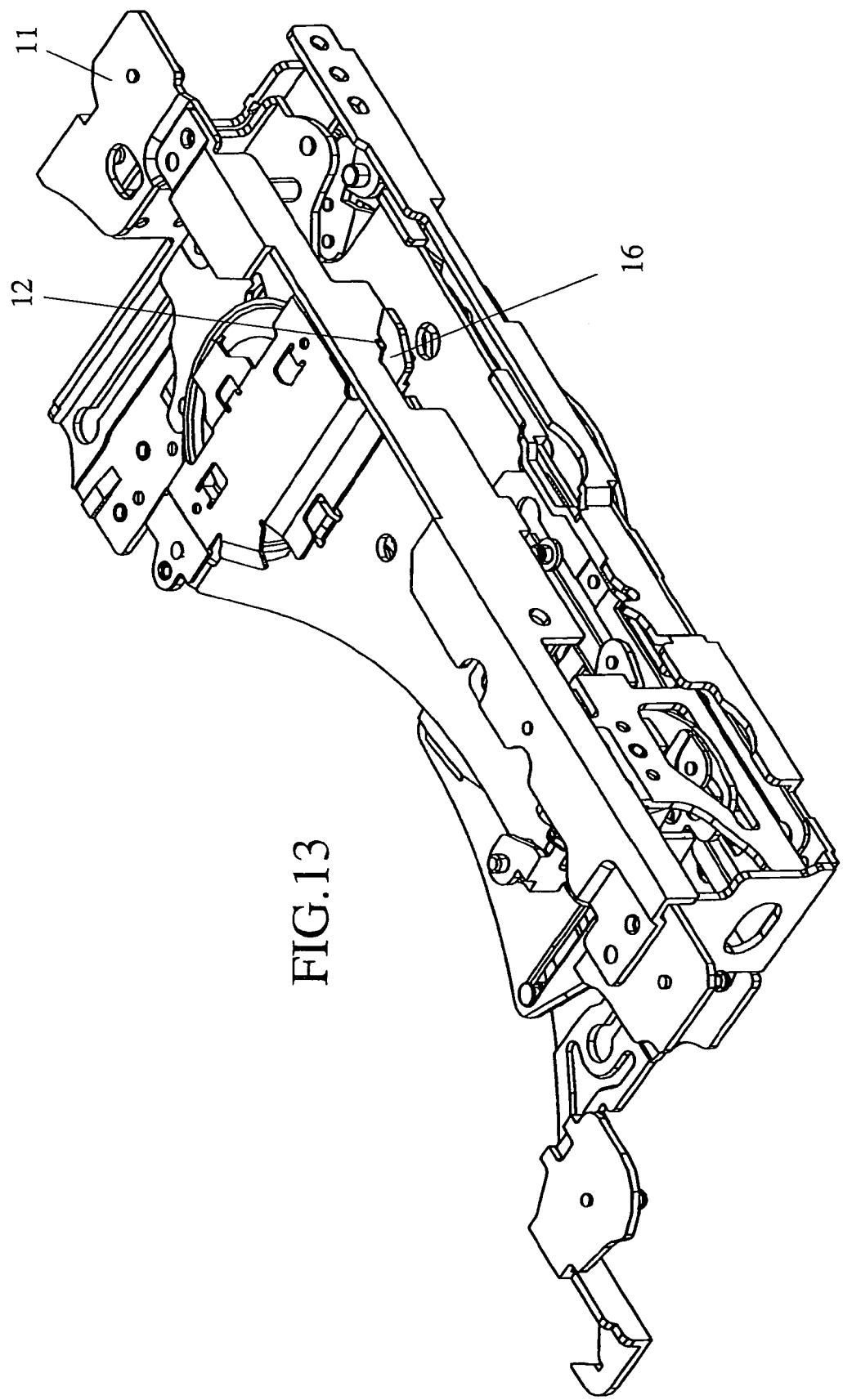
FIG. 13 is a perspective view showing the playback unit that is placed at a standby position for waiting for a pivot.

FIG. 12 shows a relationship between the engagement hook 16 and the engagement groove 12 while the slide base 13 slides, and FIG. 13 shows a relationship between the engagement hook 16 and the engagement groove 12 when the slide base 13 is placed in the retracted state. While the slide base 13 slides, the engagement hook 16 is engaged with the engagement groove 12 of the fixed base 11 in synchronization with the above-mentioned synchronized operation of the clamp arm. When the slide base 13 is placed in the retracted state, the engagement hook 16 is completely engaged with the engagement groove 12 and therefore vertical movements of the engagement hook 16 are restrained by the engagement groove 12. Simultaneously, the pivoting operation of the engagement hook 16 is restrained because the engagement hook 16 gets caught in the engagement groove 12 of the fixed base 11.

Figure 14:
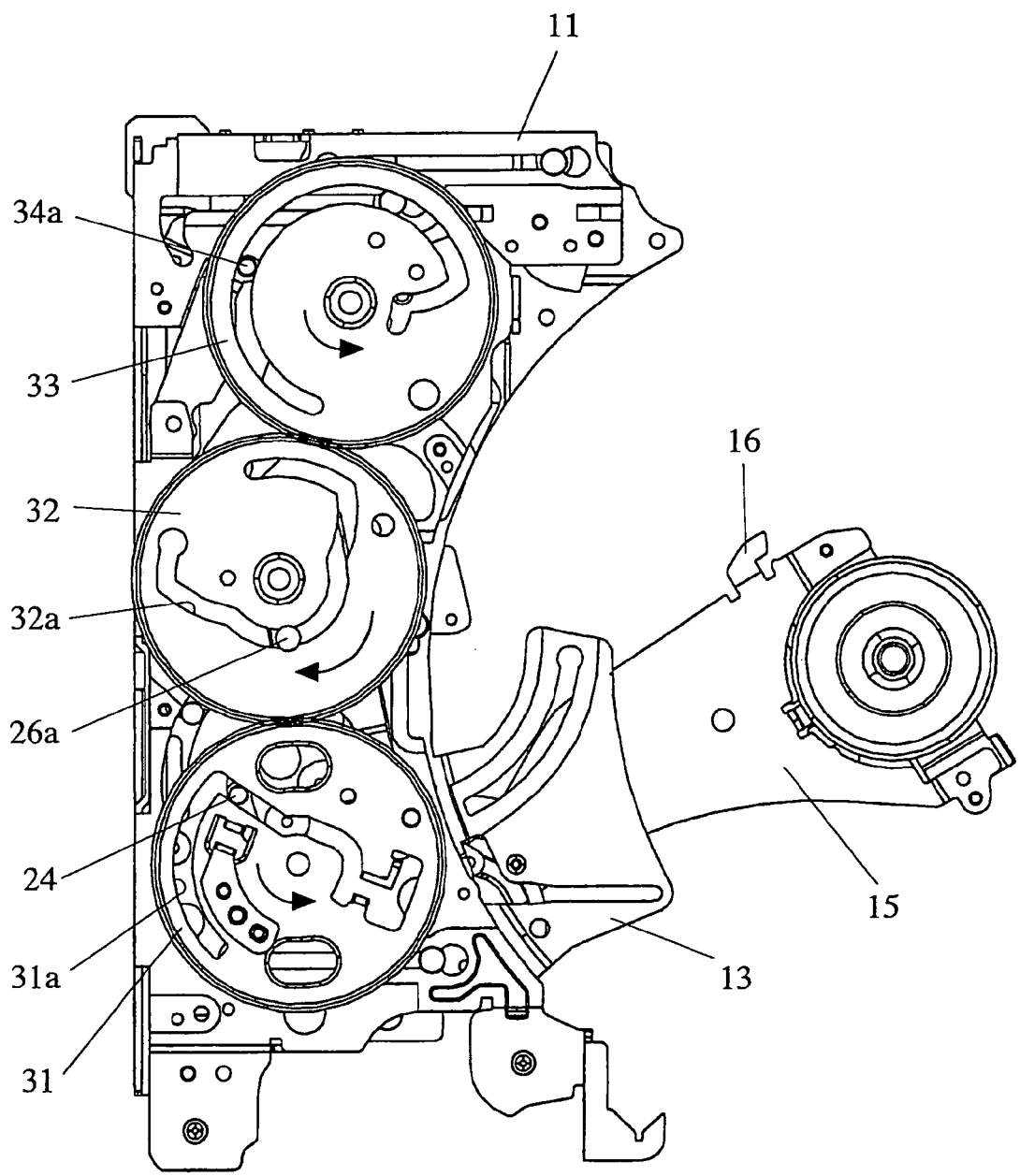
FIG. 14 is a bottom view showing a state in which the slide base is sliding.
Figure 15:
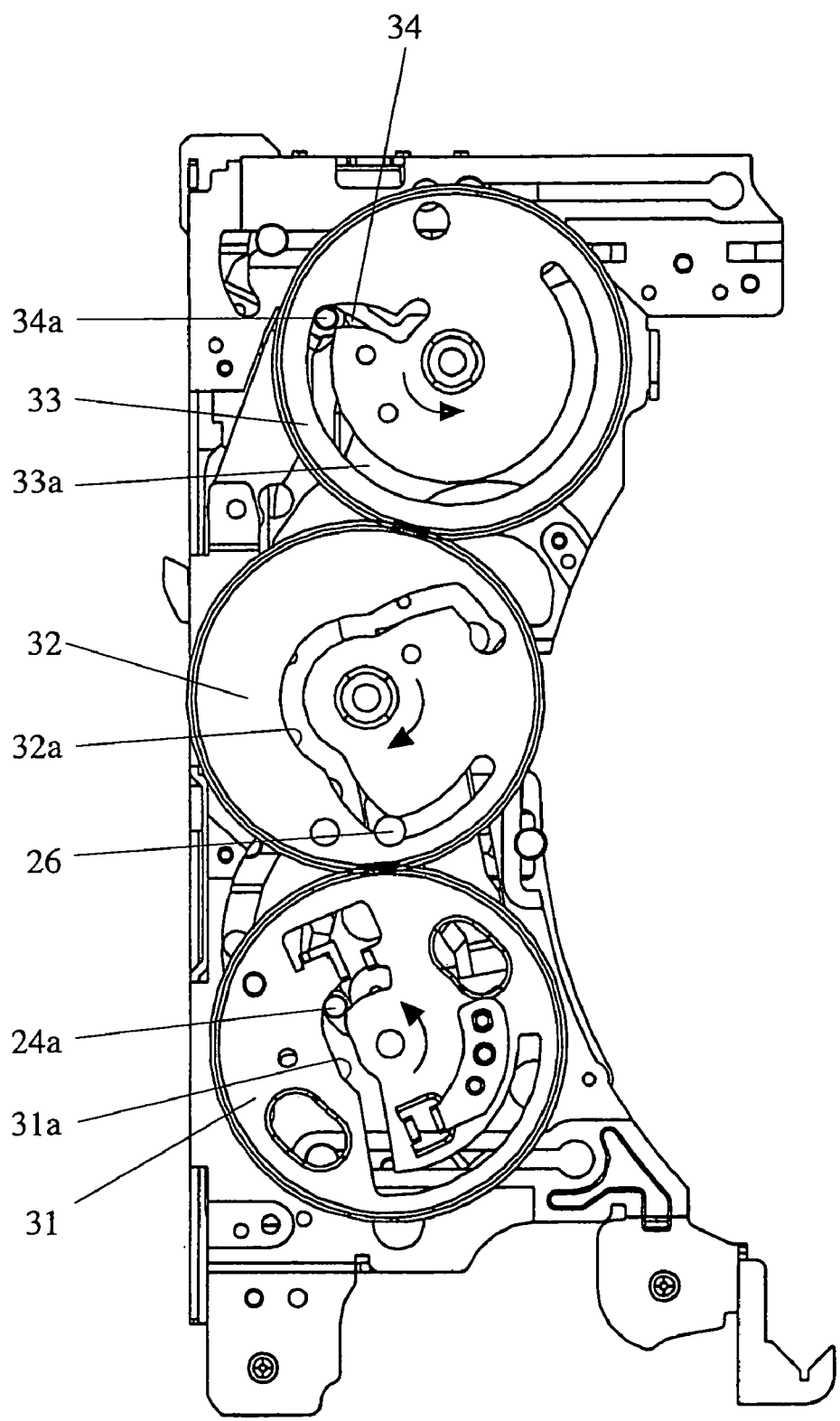
FIG. 15 is a bottom view showing a state in which the slide base is retracted.

Finally, the synchronization between the sliding operation of the slide base and the pivoting operation of the clamp arm will be explained. FIG. 14 is a bottom view showing a state in which the slide base is sliding, and FIG. 15 is a bottom view showing the retracted state in which the clamp arm is retracted. A cam gear 31 for driving the clamp arm, a cam gear 32 for driving the slide base, and a cam gear 33 for driving the playback base are arranged on a lower surface of the fixed base 11. The cam gear 31 for the clamp arm and the cam gear 32 for the slide base engage with each other. The cam gear 32 for the slide base and the cam gear 33 for the playback base engage with each other.

When a driving mechanism not shown in the figure drives the cam gear 31 for the clamp arm, the three cam gears rotate in synchronization with one another. A pin 24a of the driving lever 24 engages with a cam groove 31a of the cam gear 31 for the clamp arm, and a movement of the driving lever 24, which is caused as a driving force by the cam groove 31a, makes the clamp arm 15 pivot, as previously mentioned. A pin 26a of the slide plate 26 engages with a cam groove 32a of the cam gear 32 for the slide base, and a movement of the slide plate 26, which is caused as a driving force by the cam groove 32a, makes the lever 25 pivot and hence the slide base 13 slide, as previously mentioned. A pin 34a of a playback base pivoting lever 34 for making the playback base pivot engages with a groove 33a of the cam gear 33 for the playback base, and a movement of the playback base pivoting lever 34 which is caused as a driving force by the cam groove 33a, makes the playback base 14 pivot. By matching the timing of the pivoting operation of the clamp arm 15 with the timing of the sliding operation of the slide base 13 using the cam groove 31a of the cam gear 31 for the clamp arm and the cam groove 32a of the cam gear 32 for the slide base, the engagement hook 16 and the engagement groove 12 can be engaged with each other.

As can be seen from the above description, in accordance with this embodiment 1, when the clamp arm 15 is placed at the playback position where the disk 1 is played back, the clamp arm 15 clamps the disk 1, and, when returning to the standby position, the clamp arm 15 pivots on the slide base 13 while the slide base 13 slides in synchronization with the pivoting of the clamp arm, and this synchronization between the pivoting of the clamp arm and the sliding of the slide base results in an engagement of the engagement hook 16 of the clamp arm 15 with the engagement groove 12 of the fixed base 11. Therefore, the present embodiment offers an advantage of being able to prevent the clamp arm 15 from pivoting and vibrating when the clamp arm 15 is placed in the retracted state without addition of a special mechanism.

Furthermore, in accordance with this embodiment 1, the clamp arm 15 is disposed on the slide base 13 by way of the pivot base 21 slidably and pivotably disposed on the slide base 13. Therefore, the present embodiment offers another advantage of being able to improve the degree of the engagement of the clamp arm 15 with the fixed base 11 without addition of a special mechanism.

In accordance with this embodiment 1, the fixed base 11 and the clamp arm 15 engage with each other, as previously mentioned. In a variant of this embodiment, the playback base 14 can be disposed on the slide base 13 by way of a pivot base slidably and pivotably disposed on the slide base 13, and an engagement hook formed in the playback base 14 can be engaged with an engagement groove of the fixed base 11. As a result, the variant offers an advantage of being able to prevent the playback base 14 from pivoting and vibrating when the playback base 14 is placed in a retracted state.

Many widely different embodiments of the present invention may be constructed without departing from the spirit and scope of the present invention. It should be understood that the present invention is not limited to the specific embodiments described in the specification, except as defined in the appended claims.

What is claimed is:

1. A disk drive comprising:
a slide base slidably disposed with respect to a fixed base;
a playback base pivotably disposed with respect to said slide base, on which a turntable on which a disk is placed is disposed;
a clamp arm pivotably disposed with respect to said slide base, for clamping said disk when said disk is placed at a playback position; and
an engagement hook disposed on either or both of said playback base and said clamp arm, said engagement hook engaging with an engagement groove of said fixed base when said clamp arm pivots on said slide base so as to return to a standby position for waiting for a pivot while said slide base slides.

2. The disk drive according to claim 1, wherein said clamp arm is disposed on said slide base by way of a pivotable base that can slide and pivot on said slide base.

* * * * *